(12) United States Patent
O'Brien

(10) Patent No.: US 9,790,863 B2
(45) Date of Patent: Oct. 17, 2017

(54) FLUID TRANSFER SEAL ASSEMBLIES, FLUID TRANSFER SYSTEMS, AND METHODS FOR TRANSFERRING PROCESS FLUID BETWEEN STATIONARY AND ROTATING COMPONENTS USING THE SAME

(71) Applicant: HONEYWELL INTERNATIONAL INC., Morristown, NJ (US)

(72) Inventor: Michael O'Brien, Goodyear, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 649 days.

(21) Appl. No.: 13/857,829

(22) Filed: Apr. 5, 2013

(65) Prior Publication Data

US 2014/0300057 A1    Oct. 9, 2014

(51) Int. Cl.
  *F01D 11/02* (2006.01)
  *F16J 15/34* (2006.01)
  (Continued)

(52) U.S. Cl.
  CPC ............... *F02C 7/28* (2013.01); *F01D 5/081* (2013.01); *F01D 11/02* (2013.01); *F01D 11/025* (2013.01);
  (Continued)

(58) Field of Classification Search
  CPC ........ F01D 11/02; F01D 11/025; F01D 11/04; F16J 15/342; F16J 15/40; F16J 15/3244;
  (Continued)

(56) References Cited

U.S. PATENT DOCUMENTS 3,186,723 A * 6/1965 Wagner ................ F16J 15/3488
                                                        277/347
3,917,289 A * 11/1975 Ivanov ..................... F16J 15/10
                                                        277/400
(Continued)

FOREIGN PATENT DOCUMENTS

CA          2075604 A1    2/1994
DE          2911000 A1    10/1980
(Continued)

OTHER PUBLICATIONS

EP Examination Report for Application No. 14161206.9 dated Nov. 9, 2015.
(Continued)

*Primary Examiner* — Atif Chaudry
(74) *Attorney, Agent, or Firm* — Lorenz & Kopf, LLP

(57) ABSTRACT

Fluid transfer seal assemblies for transferring process fluid between a stationary component and a rotating component, fluid transfer systems, and methods for transferring process fluid between the stationary and rotating components via a fluid transfer assembly are provided. A rotatable component includes a sealing surface. The fluid transfer seal assembly comprises a face seal ring having at least one segment of a fluid passageway and a sealing face configured to be disposed opposite of the sealing surface. The sealing face or the opposed sealing surface includes a geometric feature for forming a hydrodynamic seal therebetween. A secondary seal is configured to be disposed between and contacting the face seal ring and the stationary component.

15 Claims, 13 Drawing Sheets

(51) Int. Cl.
*F16J 15/447* (2006.01)
*F01D 11/04* (2006.01)
*F02C 7/28* (2006.01)
*F16J 15/40* (2006.01)
*F16J 15/3244* (2016.01)
*F01D 5/08* (2006.01)

(52) U.S. Cl.
CPC .......... *F01D 11/04* (2013.01); *F16J 15/3244* (2013.01); *F16J 15/342* (2013.01); *F16J 15/3448* (2013.01); *F16J 15/3484* (2013.01); *F16J 15/40* (2013.01); *F16J 15/4472* (2013.01); *F16J 15/4476* (2013.01)

(58) Field of Classification Search
CPC .. F16J 15/4472; F16J 15/3448; F16J 15/4476; Y10T 137/86268
See application file for complete search history.

(56) References Cited

U.S. PATENT DOCUMENTS

| | | | |
|---|---|---|---|
| 4,294,454 | A | 10/1981 | Cannings |
| 4,375,891 | A | 3/1983 | Pask |
| 4,743,162 | A | 5/1988 | Pope |
| 5,026,252 | A | 6/1991 | Hoffelner |
| 5,058,904 | A | 10/1991 | Nevola |
| 5,066,026 | A | 11/1991 | Heck et al. |
| 5,080,556 | A | 1/1992 | Carreno |
| 5,143,384 | A | 9/1992 | Lipschitz |
| 5,145,189 | A | 9/1992 | Pope |
| 5,174,584 | A | 12/1992 | Lahrman |
| 5,375,853 | A | 12/1994 | Wasser et al. |
| 5,509,664 | A | 4/1996 | Borkiewicz |
| 5,516,118 | A | 5/1996 | Jones |
| 5,531,458 | A | 7/1996 | Sedy |
| 5,558,341 | A | 9/1996 | McNickle et al. |
| 5,577,885 | A | 11/1996 | Urlichs |
| 5,582,413 | A | 12/1996 | Lendway |
| 5,613,829 | A | 3/1997 | Wolfe et al. |
| 5,722,665 | A | 3/1998 | Sedy et al. |
| 5,755,445 | A | 5/1998 | Arora |
| 5,769,604 | A | 6/1998 | Gardner et al. |
| 5,941,532 | A | 8/1999 | Flaherty et al. |
| 5,944,320 | A | 8/1999 | Werner et al. |
| 5,975,535 | A | 11/1999 | Gail et al. |
| 5,997,004 | A | 12/1999 | Braun et al. |
| 6,007,068 | A | 12/1999 | Dellacorte |
| 6,045,134 | A | 4/2000 | Turnquist et al. |
| 6,145,843 | A | 11/2000 | Hwang |
| 6,189,896 | B1 | 2/2001 | Dickey et al. |
| 6,196,790 | B1 | 3/2001 | Sheridan et al. |
| 6,220,814 | B1 | 4/2001 | Brushwood et al. |
| 6,244,599 | B1 | 6/2001 | Braun et al. |
| 6,290,232 | B1 | 9/2001 | Reluzco et al. |
| 6,315,301 | B1 | 11/2001 | Umemura et al. |
| 6,338,490 | B1 | 1/2002 | Bainachi |
| 6,340,286 | B1 | 1/2002 | Aksit et al. |
| 6,341,782 | B1 | 1/2002 | Etsion |
| 6,343,792 | B1 | 2/2002 | Shinohara et al. |
| 6,347,800 | B1 | 2/2002 | Auber |
| 6,416,057 | B1 | 7/2002 | Adams et al. |
| 6,431,555 | B1 | 8/2002 | Schroder et al. |
| 6,446,976 | B1 | 9/2002 | Key et al. |
| 6,464,231 | B2 | 10/2002 | Burroughs |
| 6,502,823 | B1 | 1/2003 | Turnquist et al. |
| 6,619,908 | B2 | 9/2003 | Bruno et al. |
| 6,623,238 | B2 | 9/2003 | Langston et al. |
| 6,629,816 | B2 | 10/2003 | Langston et al. |
| 6,682,307 | B1 | 1/2004 | Tiemann |
| 6,692,006 | B2 | 2/2004 | Holder |
| 6,719,296 | B2 | 4/2004 | Brauer et al. |
| 6,758,477 | B2 | 7/2004 | Brauer et al. |
| 6,811,154 | B2 | 11/2004 | Proctor et al. |
| 6,854,736 | B2 | 2/2005 | Paprotna |
| 6,877,950 | B2 | 4/2005 | Liu |
| 6,887,038 | B2 | 5/2005 | Cabe et al. |
| 6,918,594 | B2 | 7/2005 | Sund et al. |
| 6,932,567 | B2 | 8/2005 | Albers et al. |
| 6,969,231 | B2 | 11/2005 | Ghasripoor et al. |
| 6,969,236 | B2 | 11/2005 | Giesler et al. |
| 7,044,470 | B2 | 5/2006 | Zheng |
| 7,175,388 | B2 | 2/2007 | Labbe et al. |
| 7,407,198 | B2 * | 8/2008 | Ott ........................ F16L 27/087 285/121.1 |
| 7,419,164 | B2 | 9/2008 | Awtar et al. |
| 7,432,620 | B2 | 10/2008 | Freal et al. |
| 7,540,501 | B2 | 6/2009 | Flaherty |
| 7,631,501 | B2 | 12/2009 | Boston et al. |
| 7,726,940 | B2 | 6/2010 | Snowsill |
| 7,770,895 | B2 | 8/2010 | Zheng et al. |
| 7,780,399 | B1 | 8/2010 | Garrison |
| 7,938,404 | B2 * | 5/2011 | Hagen ................. F16J 15/3484 277/369 |
| 8,272,643 | B2 | 9/2012 | Garrison et al. |
| 2004/0161333 | A1 | 8/2004 | Klaass et al. |
| 2006/0082074 | A1 | 4/2006 | Synnott et al. |
| 2006/0207834 | A1 | 9/2006 | Giesler et al. |
| 2006/0292001 | A1 | 12/2006 | Keller et al. |
| 2008/0003099 | A1 | 1/2008 | Giesler et al. |
| 2008/0025838 | A1 | 1/2008 | Marini et al. |
| 2008/0044284 | A1 | 2/2008 | Alvanos |
| 2008/0100001 | A1 | 5/2008 | Flaherty |
| 2008/0217859 | A1 | 9/2008 | Addis |
| 2008/0310953 | A1 * | 12/2008 | Garrison ............... F01D 11/025 415/173.2 |
| 2009/0212501 | A1 | 8/2009 | Glahn et al. |

FOREIGN PATENT DOCUMENTS

| | | |
|---|---|---|
| DE | 3828833 A1 | 3/1990 |
| DE | 3832560 A1 | 3/1990 |
| DE | 102006028153 A1 | 2/2008 |
| EP | D355649 A2 | 8/1989 |
| EP | D816726 A1 | 1/1998 |
| EP | 1544522 A1 | 6/2005 |
| EP | 1777376 A2 | 4/2007 |
| EP | 2060742 A2 | 5/2009 |
| EP | 2233700 A1 | 9/2010 |
| GB | 2461506 A | 1/2010 |
| JP | 2146374 A | 6/1990 |
| JP | 2000154877 A | 6/2000 |
| JP | 2003227306 A | 8/2003 |
| JP | 2007009901 A | 1/2007 |
| JP | 2010106791 A | 5/2010 |
| JP | 2012097761 | 5/2012 |
| WO | 9958834 A2 | 11/1999 |
| WO | 2006130166 A2 | 12/2006 |
| WO | 2010076634 A1 | 7/2010 |

OTHER PUBLICATIONS

EP Search Report, EP 14161206.9-1751/2787257 dated Sep. 25, 2014.
EP Examination Report for Application No. 14161206.9 dated Oct. 15, 2014.
EP Examination Report for Application No. 14161206.9 dated May 2, 2016.
EP Communication for Application No. 14 161 206.9-1751 dated Nov. 30, 2016.

* cited by examiner

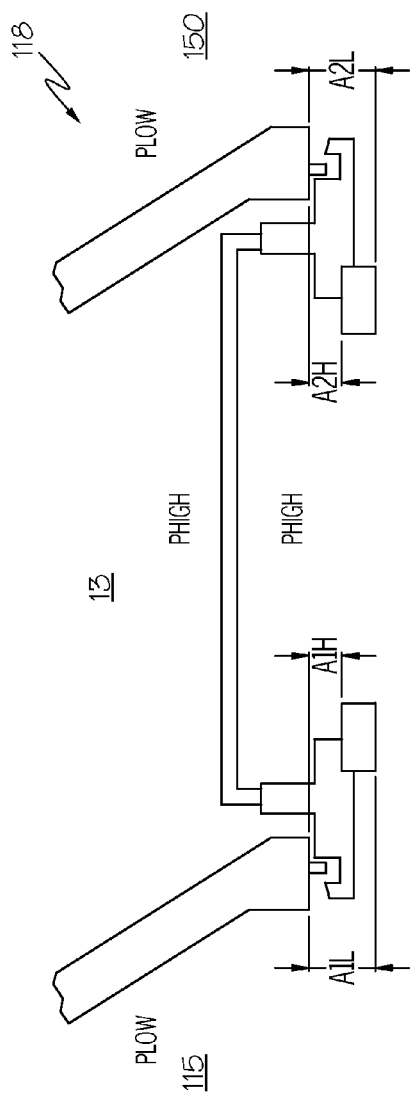
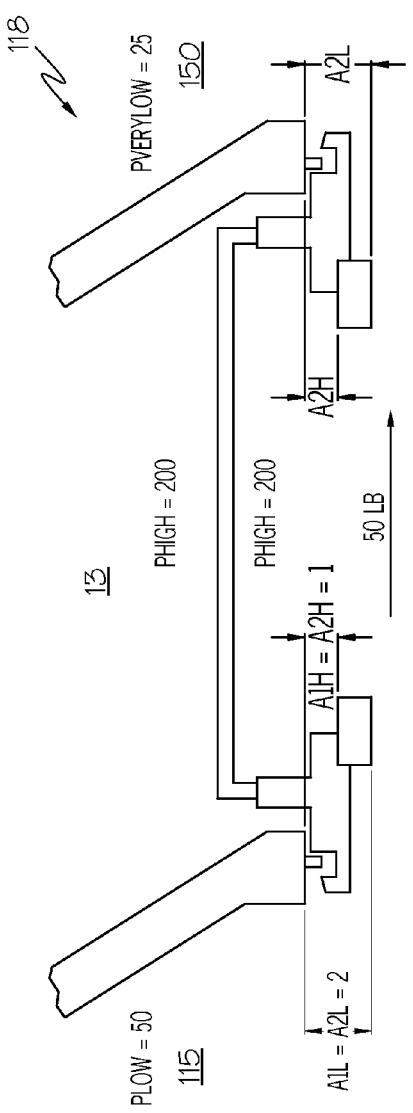

FLUID TRANSFER SEAL ASSEMBLIES, FLUID TRANSFER SYSTEMS, AND METHODS FOR TRANSFERRING PROCESS FLUID BETWEEN STATIONARY AND ROTATING COMPONENTS USING THE SAME

TECHNICAL FIELD

The present invention generally relates to gas turbine engines, and more particularly relates to fluid transfer seal assemblies, fluid transfer systems, and methods for transferring process fluid between stationary and rotating components using the same.

BACKGROUND

There are many applications requiring that a process fluid be controllably transferred across an interface between a stationary component and a rotatable component in rotating equipment having at least one component which is rotatable with respect to at least one other adjacent component. Depending upon whether or not the transferred process fluid is at higher or lower pressure than the surroundings, this fluid transfer involves some process fluid leakage or ingestion. Minimizing the process fluid loss or ingestion is important for maintaining rotating equipment performance. As used herein, the term "process fluid" refers to any fluid that is used as the primary working fluid in a device, system, or process.

Minimizing process fluid leakage or ingestion requires a seal between the stationary and rotating components. The sealing function should be accomplished with minimum generation of heat, so that adjacent components and the process fluid itself are not excessively heated. This is particularly important in high speed rotating equipment, where seal rubbing can produce high heat generation. In addition, depending upon the application, the seal arrangement used may have differing pressures acting on the surfaces involved, and the forces produced by these pressures on the seal components need to be managed to insure high loads are not transmitted between the stationary and rotating components. Mechanical seals such as labyrinth seals, brush seals, and finger seals have been used to facilitate such process fluid (air) transfer. However, these mechanical seals may themselves leak and generate excessive heat. Journal type seals have been used for low speed, liquid transfer applications, but may also result in high leakage rates and require close clearance dimensional controls.

The transfer of cooling air (a process fluid) from a stationary tangential on-board injector (TOBI) to the rotating turbine of a gas turbine engine is one example of such an application where conventional mechanical seals have not adequately reduced process fluid leakage or ingestion. The TOBI provides cooling air to the turbine of the gas turbine engine. In particular, an inlet of the TOBI receives air from a compressor of the gas turbine engine or another source of cooling air and passes it through nozzles that impart a swirling moment and direct the discharging stream tangentially to the rotating turbine. The cooling air discharged from the TOBI is delivered into a cavity upstream of the turbine. The cavity may be sealed off by conventional inner and outer mechanical seals that substantially seal the interface between the rotating and stationary (i.e., non-rotating) structures. Unfortunately, some of the cooling air discharged from the TOBI is leaked through the seals, resulting in an adverse effect on TOBI performance. More specifically, leakage of the cooling air from the TOBI results in less cooling air going to the turbine for cooling, thereby causing the turbine to run hotter and shortening its life. If extra cooling air is supplied to compensate for leakage to preserve turbine life, engine performance including fuel consumption and power may be compromised. Other applications requiring that a process fluid be controllably transferred across an interface between a stationary component and a rotatable component in rotating equipment are similarly adversely affected by process fluid leakage or ingestion that is not adequately prevented by conventional mechanical seals.

Accordingly, it is desirable to provide fluid transfer seal assemblies, fluid transfer systems, and methods for transferring process fluid between stationary and rotating components using the same. It is also desired to provide fluid transfer seal assemblies that minimize process fluid leakage and ingestion, heat generation, and manage differing pressure loads that may exist on the sealing components to substantially prevent overload and rubbing.

BRIEF SUMMARY

Fluid transfer seal assemblies are provided for transferring process fluid between a stationary component and a rotating component. The rotating component includes a sealing surface. In accordance with an exemplary embodiment, the fluid transfer seal assembly comprises a face seal ring and a secondary seal. The face seal ring has at least one segment of a fluid passageway and a sealing face configured to be disposed opposite of the sealing surface. One of the sealing face or the opposed sealing surface includes a geometric feature for forming a hydrodynamic seal therebetween. The secondary seal is configured to be disposed between and contacting the face seal ring and the stationary component.

Fluid transfer systems for transferring process fluid between a stationary component and a rotating component are also provided in accordance with another exemplary embodiment of the present invention. A fluid transfer system comprises a stationary component having an interior containing process fluid under pressure. A rotatable component is in fluid flow communication with the interior of the stationary component via a fluid passageway. The rotatable component has a sealing surface along a portion thereof. A fluid transfer seal assembly is disposed between the stationary component and the rotatable component. The fluid transfer seal assembly comprises a face seal ring and a secondary seal. The face seal ring has at least one segment of the fluid passageway and a sealing face configured to be disposed opposite of the sealing surface. One of the sealing face or the opposed sealing surface includes a geometric feature for forming a hydrodynamic seal therebetween. The secondary seal is configured to be disposed between and contacting an adjacent face seal ring and the stationary component.

Methods for transferring process fluid from a stationary component containing the process fluid under pressure to a rotating component via a fluid transfer seal assembly are also provided in accordance with another exemplary embodiment of the present invention. The rotating component has a sealing surface. The method comprises disposing the fluid transfer seal assembly between the stationary component and the rotatable component such that the rotatable component is in fluid flow communication with the stationary component. The fluid transfer seal assembly comprises a face seal ring and a secondary seal. The face seal ring has at least one segment of a fluid passageway and a sealing face configured to be disposed opposite the sealing surface of the rotatable component for forming a gap therebetween. The sealing face or the opposed sealing surface includes a geometric feature for forming a hydrodynamic seal in the gap. The secondary seal is disposed between and contacting the face seal ring and the stationary component. The rotatable component is caused to rotate to become the rotating component, thereby transferring the process fluid from the stationary component to the rotating component through the fluid passageway and into the gap forming the hydrodynamic seal.

Furthermore, other desirable features and characteristics of the assembly, system, and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 3A through 3C are schematic diagrams illustrating a pressure balancing technique used for the fluid transfer seal assembly of FIG. 3;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to fluid transfer seal assemblies, fluid transfer systems, and methods for transferring process fluid between stationary and rotating components using the same. Fluid transfer systems including the fluid transfer seal assembly facilitate process fluid transfer across an interface between a stationary component and a rotating component with minimum process fluid leakage or ingestion, and heat generation as well as managing differing pressure loads on the seal components to substantially prevent overload and rubbing thereof. As used herein, the term "process fluid" refers to any fluid used as the primary working fluid in a device, system, or process. The "process fluid" may also be a "barrier fluid" as hereinafter described. The term "interface" as used herein refers to the space between the stationary component and the rotatable component and the space between a face seal ring and the stationary component as hereinafter described. While the advantages of the present invention will be described with reference to particularly illustrated arrangements, other embodiments may be differently arranged from that depicted. The specific arrangement may be modified to accommodate the specific application.

Figure 1:
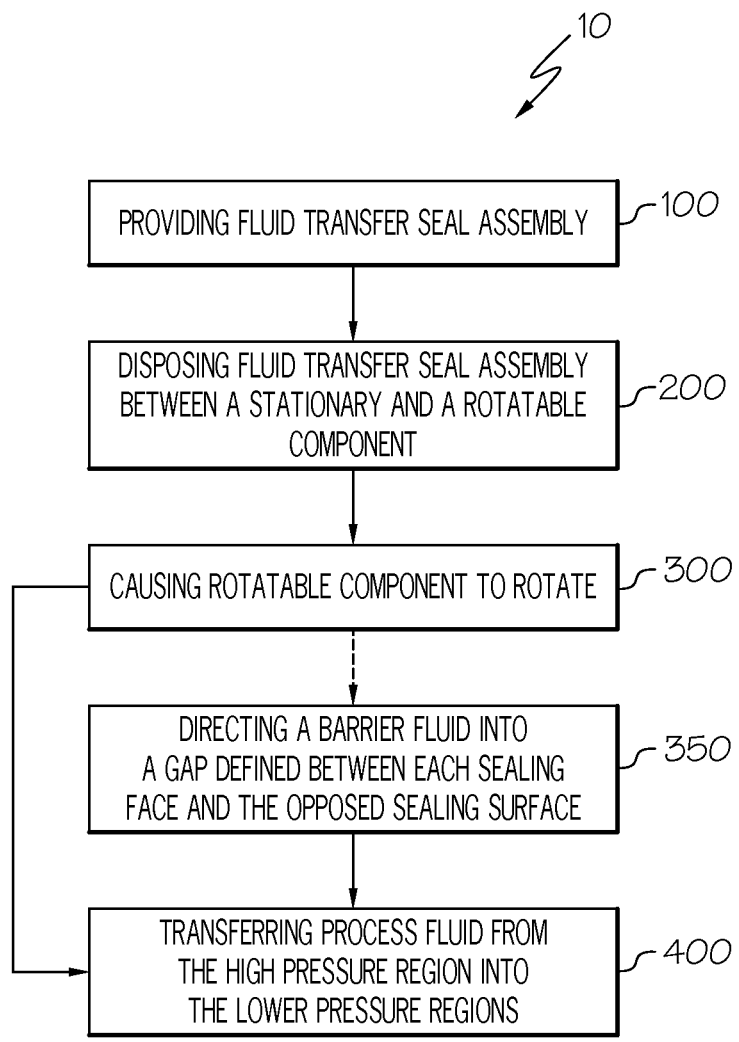
FIG. 1 is a flow diagram of a method for transferring process fluid [across an interface] between a stationary and a rotating component, according to exemplary embodiments of the present invention.

Referring to FIG. 1, according to exemplary embodiments, a method 10 for transferring process fluid between a stationary component and a rotating component begins by providing a fluid transfer seal assembly (step 100). Referring now to FIGS. 2, 2A, 3, and 4 through 7, the process fluid flow ("PF") is indicated with arrows. As indicated previously, there are many applications which require that the process fluid be controllably transferred across an interface between a stationary component and a rotatable component, i.e., in rotating equipment having at least one component which is rotatable with respect to at least one other adjacent component. A non-limiting example of a rotatable component and a stationary component in rotating equipment includes, respectively, a rotating shaft and a stationary housing in a gas turbine engine. Another non-limiting example of the stationary component and the rotating component respectively includes a tangential onboard injector (TOBI) and a turbine (FIGS. 6 and 7) in the gas turbine engine. It is to be understood that the fluid transfer seal assemblies and fluid transfer systems as described herein in accordance with exemplary embodiments may be used in any industry to facilitate process fluid transfer across the interface between stationary and rotating components.

Figure 2:
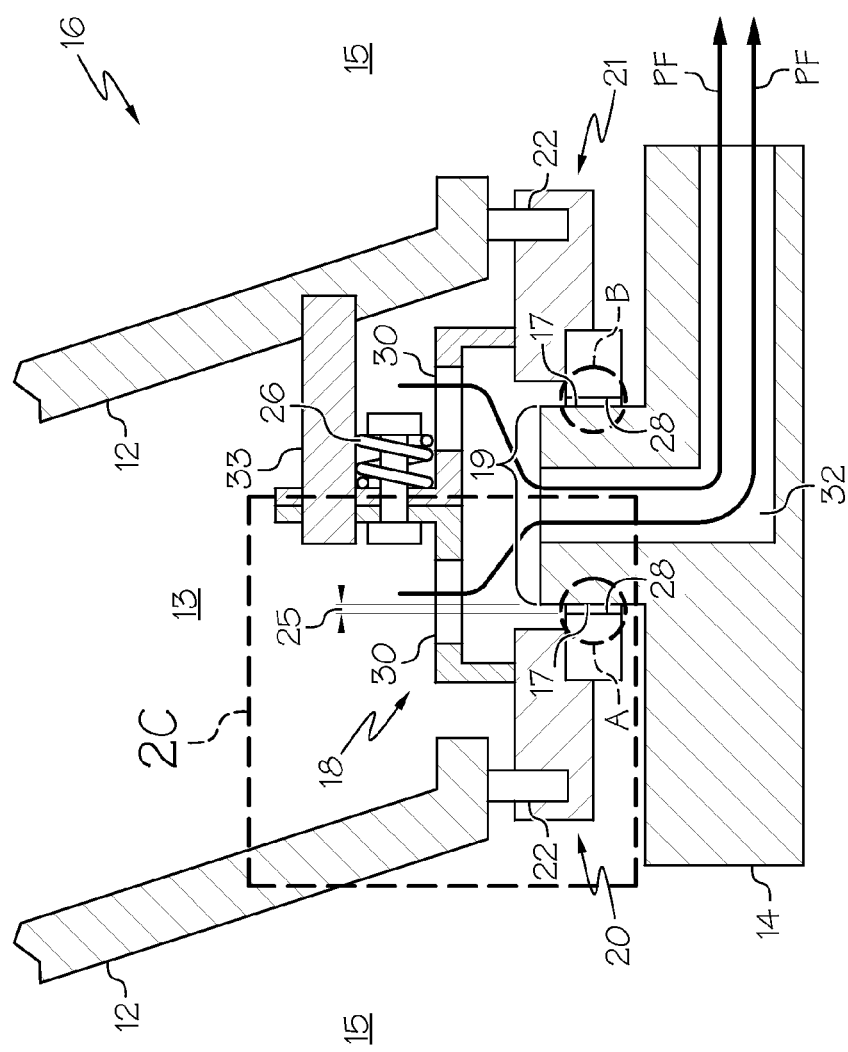
FIGS. 2 through 2B are cross-sectional views of a fluid transfer seal assembly in a fluid transfer system according to exemplary embodiments.
Figure 2A:
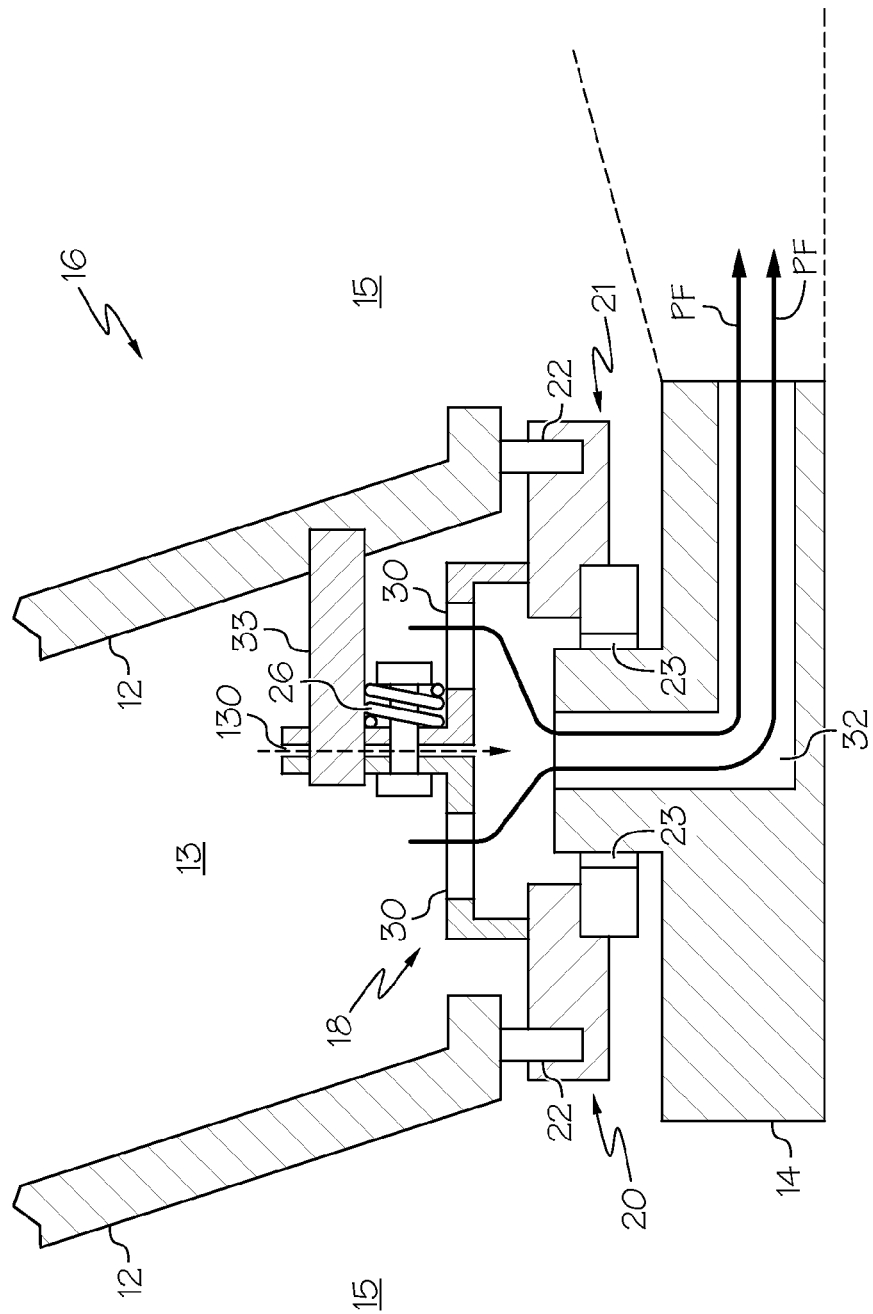
FIG. 2C is an enlarged view of a face seal ring of the fluid transfer seal assembly of FIGS. 2 and 2A.
Figure 2B:
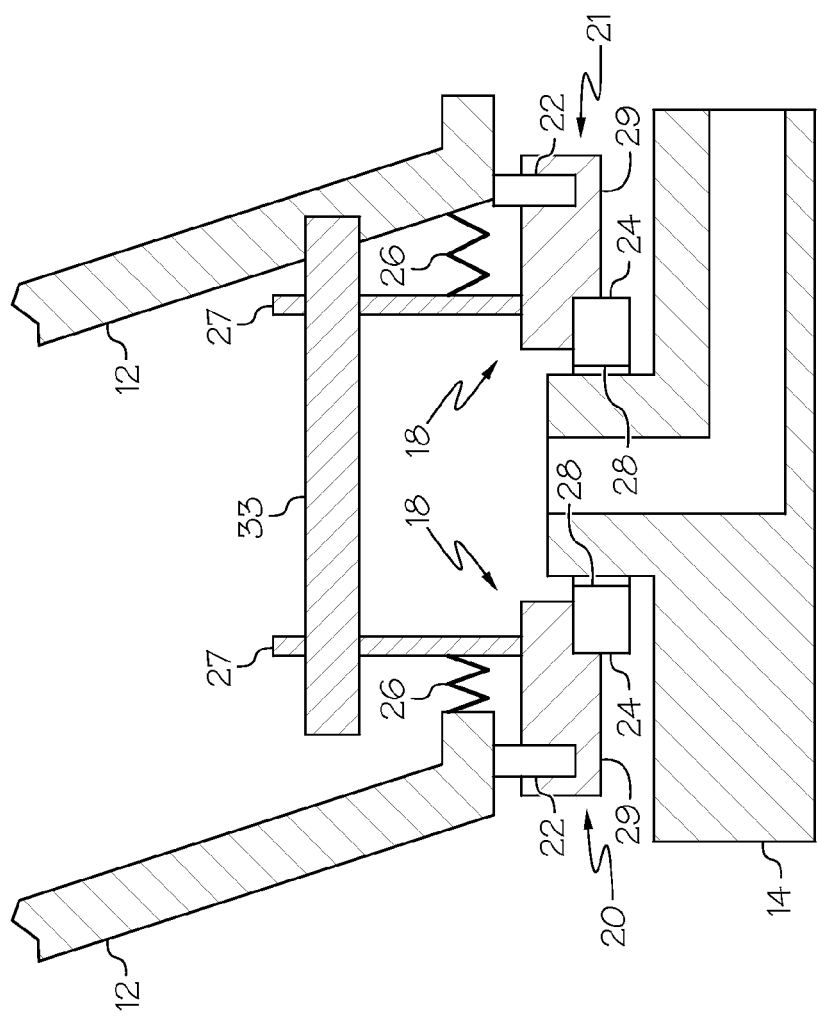

Referring now specifically to FIGS. 2 through 2B, in accordance with exemplary embodiments, a fluid transfer system 16 is illustrated. The fluid transfer system 16 comprises a stationary component 12 (exemplified by a stationary housing (partially shown)) having an interior 13 containing process fluid under pressure, a rotatable component 14, and fluid transfer seal assembly 18 disposed across the interface between the stationary component 12 and the rotatable component 14. The interior 13 of the stationary component may be a high pressure region relative to a pair of surrounding lower pressure regions 15 exterior of the stationary component. However it is to be understood that while the interior 13 is described as a high pressure region that is disposed between a pair of surrounding lower pressure regions 15, the high and lower pressure regions may be reversed such that the regions surrounding the stationary component may be at a higher pressure relative to the pressure in the interior of the stationary component. The rotatable component 14 includes a pair of sealing surfaces 17 and central hub portion 19, for purposes as hereinafter described. As illustrated, the rotatable component 14 is in fluid flow communication with the interior 13 of the stationary component via one or more fluid passageways comprising a plurality of fluid passageway segments. The rotatable component 14 includes an L-shaped fluid passageway segment 32. The L-shaped segment 32 extends through the central hub portion and extends afterward through the rotatable component 14. The L-shaped fluid passageway delivers the process fluid to the area required for the intended distribution thereof within the rotatable component. It is to be understood that the fluid passageway segments and fluid passageway may have configurations other than as illustrated.

Figure 2C:
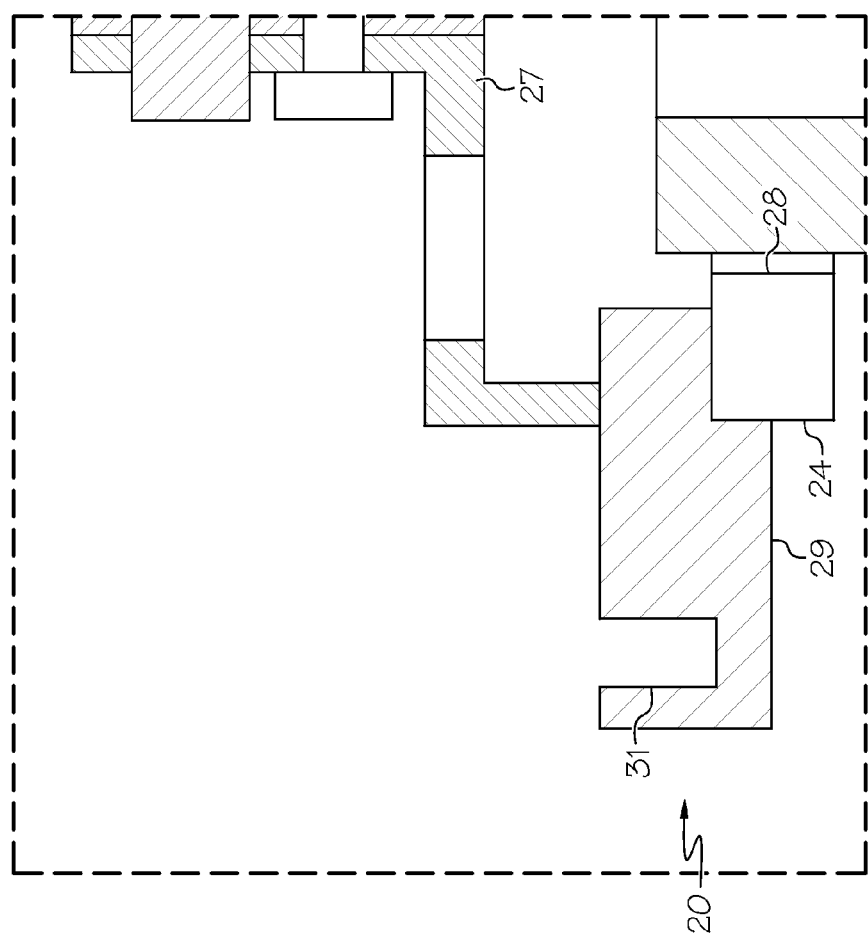

Still referring to FIGS. 2 through 2C, in accordance with exemplary embodiments, fluid transfer seal assembly 18 generally comprises a pair of face seal rings 20 and 21 and a pair of secondary seals 22. Face seal ring 20 is enlarged in FIG. 2C to illustrate that face seal ring 20 is comprised of a seal nose 24 with a sealing face 28, a retainer 29 that supports the seal nose 24, and a retainer extension 27. The retainer includes a groove 31 for receiving the secondary seal 22. The seal nose 24 of face seal ring 20 includes a sealing face 28 for purposes as hereinafter described. The seal nose may be made from a material capable of tolerating some rubbing contact. Non-limiting examples of material for the seal nose include ceramic, graphite, or both. The retainer extension 27 may be attached as a separate part (e.g., as a Z-shaped retainer extension) to the retainer 29 or integral (e.g., as a longitudinal extension) with the retainer. Face sealing ring 21 is identical in configuration to face sealing ring 20. Fluid transfer seal assembly 18 may further comprise means for locking the pair of face seal rings to the stationary component 12 in a manner preventing rotation thereof with respect to the stationary component (hereinafter an "anti-rotation device") and may further comprise a mechanical loading device 26, as hereinafter described. The retainer extensions 27 may engage the anti-rotation device, as hereinafter described.

As used herein, the phrase "a pair of face seal rings" may refer to two separate face seal rings (such as face seal rings 20 and 21) but may alternatively where noted (FIGS. 3 and 5), refer to a single unit comprised of two connected face seal rings. As used herein, the phrase "a face seal ring" refers to a single face seal ring (e.g., FIG. 7) or a pair of face seal rings (FIGS. 2 through 6).

Face seal rings 20 and 21 each include fluid passageway segments 30 therethrough that are in fluid communication with the interior 13 of the stationary component and with the L-shaped segment 32 in the rotatable component. FIG. 2A is similar to FIG. 2, with the addition of a fluid passageway segment 130 defined between the retainer extensions 27 of the face seal rings 20 and 21 and through the anti-rotation device.

Each of the sealing faces 28 is configured to be disposed opposite a corresponding sealing surface 17 (also referred to herein as "an opposed sealing surface") of the pair of sealing surfaces defining a gap 25 forming a hydrodynamic seal when the rotatable component rotates as hereinafter described. As each face seal ring of the pair of face seal rings has a sealing face that is configured to be opposite a corresponding sealing surface, a pair of hydrodynamic seals (encircled regions A and B) is formed. The sealing face or the sealing surface of each hydrodynamic seal has a geometric feature 23 (also referred to herein as "hydrodynamic geometry") for purposes of promoting a barrier fluid film (not shown) on which operation of the hydrodynamic seals depend, also as hereinafter described.

The face seal rings 20 and 21 in the illustrated fluid transfer seal assembly 18 are arranged in a position opposite each other, with the sealing faces 28 of the seal nose 24 of each face seal ring 20 and 21 facing toward each other. Each sealing face 28 is configured to oppose and define the gap with the corresponding sealing surface of the rotatable component. The sealing surfaces 17 are on opposite sides of the central hub portion 19 of the rotatable component 14 such that the central hub portion 19 is disposed between the two opposed sealing faces 28.

As noted previously, the geometric feature 23 is located along one of the sealing face 28 (of the sealing nose) or the sealing surface 17 and promotes a positive-stiffness barrier fluid film between the sealing face and the corresponding sealing surface when the rotatable component rotates during operation of the rotating equipment, as hereinafter described. The sealing face and the corresponding sealing surface ride on the barrier fluid film when the rotatable component rotates. Hydrodynamic seals have been used as non-contact mechanical seals. Their principal advantage is negligible wear regardless of the pressure gradient and speed of operation. The disadvantage is that some leakage must occur to maintain the barrier fluid film. The pair of hydrodynamic seals work on the principle that a barrier fluid is directed into the gap 25 between the sealing face 28 and the corresponding sealing surface 17 during rotation of the rotatable component (the rotating rotatable component is referred to herein as a "rotating component") to increase the barrier fluid pressure causing the sealing face and corresponding sealing surface to separate. As used herein, a "barrier fluid" is a fluid that is directed between the sealing face and the corresponding sealing surface, quite often at a pressure that is higher than the pressure of the process fluid. In some embodiments, a fluid may be both the process fluid and the barrier fluid. For example, in a turbine engine, the process fluid and the barrier fluid are the same fluid. When the same fluid serves as both process fluid and barrier fluid, the fluid serving as the process fluid may be at a different temperature and/or pressure than when serving as the barrier fluid. When the rotatable component rotates, the process fluid is transferred from the stationary component to the rotating component via the fluid transfer seal assembly and separately, into the gap(s) between the sealing face and corresponding sealing surface, thereby also serving as the barrier fluid. In other embodiments, the barrier fluid may be different from the process fluid and barrier fluids as known in the art may be used. A barrier fluid that is different from the process fluid may be used, for example, if there is a desire to keep the process fluid away from the sealing face and/or sealing surface (e.g., if the process fluid is dirty, contaminated, or the like (i.e., detrimental to the seal).

The barrier fluid is pumped between the sealing face and the corresponding sealing surface of each hydrodynamic seal. When the process fluid is the barrier fluid as described above, the process fluid is necessarily pumped to the gap(s) as a result of the rotatable component rotating. Hydrodynamic seal depends upon the generation of a lifting force to separate the sealing face and the corresponding sealing surface. The hydrodynamic seal is designed to create hydrodynamic pressure to further separate the sealing face and the corresponding sealing surface. The hydrodynamic pressure generated depends on the relative sliding of the seal face and the corresponding sealing surface. The lifting force is created by the hydrodynamic geometry (the sealing face or sealing surface geometric feature (shape or configuration), generating a pressure distribution that acts over the area of the sealing face and/or the sealing surface. The sealing face and corresponding sealing surface will separate when the lifting force is sufficient to overcome the closing force produced by the mechanical loading device 26 (if used) as hereinafter described and any pressure caused closing forces resulting from the face seal ring geometry and the pressure differential across the hydrodynamic seal. The speed at which separation occurs depends upon the specific hydrodynamic geometry used and the total closing force. Hydrodynamic forces are generated by the viscous shear of the barrier fluid film when the rotatable component is rotating. A pressure gradient exists across the boundaries and hydrodynamic seals operate at very small film thickness to inhibit leakage. Hydrodynamic seals use relative velocity to generate the positive stiffness barrier fluid film at the interface between the sealing face and the corresponding sealing surface. Superimposed upon the usual pressure drop across the interface is the hydrodynamic contribution, produced by the geometric feature, which causes pressure to rise in the circumferential direction. Gap closure causes the peak pressure to increase, while a gap opening will cause a reduction in pressure, resulting in a positive fluid film stiffness between the opposed surfaces. There are many geometric features that generate the barrier fluid film. The underlying hydrodynamic principle may use a shallow step height change on one of the sealing face or the sealing surface to squeeze the barrier fluid film and generate fluid pressure. Known design variations for the geometric feature include Rayleigh pad, spiral groove, wave face, and others. All demonstrate various capabilities to control leakage and generate the seal face and corresponding seal surface separating pressure. It is to be understood that the advantages of the present invention have not been described with reference to any particular illustrated hydrodynamic geometry, as any hydrodynamic geometry known in the art may be used to provide the hydrodynamic lifting force. It is to be noted that fluid transfer seal assembly 18 facilitates process fluid transfer even if the rotatable component is not rotating (as long as there is sufficient pressure to drive the flow of process fluid) however the hydrodynamic geometry operates effectively only while the rotatable component rotates.

The secondary seals 22 in fluid transfer seal assembly 18 are disposed between and contacting the stationary component 12 and the adjacent face seal ring 20 and 21 so as to contain the process fluid within boundaries defined by the pair of secondary seals, i.e., each secondary seal closes a leak path between the stationary component and the adjacent face seal ring. The secondary seal may be an O-ring, a piston ring, a metal bellows, or the like as known in the art. As known in the art, a welded metal bellows is fabricated by welding together a series of thin metal disks to form an accordion type structure which may be assembled to other components of the hydrodynamic fluid transfer seal assembly. If metal bellows are used as the secondary seals in fluid transfer seal assembly 18, it is to be understood that separate locking means 24 and mechanical load device 26 as hereinafter described are unnecessary and may be eliminated from fluid transfer seal assembly 18.

As noted previously, fluid transfer seal assembly 18 may further comprise means 33 for locking the pair of face seal rings to the stationary component 12 in a manner preventing rotation thereof with respect to the stationary component (the "anti-rotation device"). The locking means may comprise a pin or lug attached to the stationary component and that engages a slot or other opening in the face seal ring, or engages a component attached to or otherwise part of the face seal ring (such as the retainer extension 27 of face seal ring 20 or 21).

As also noted previously, fluid transfer seal assembly 18 may further comprise a mechanical loading device 26 as exemplified by one or more springs to help insure the sealing relationship between the fluid transfer seal assembly and the rotatable component (more specifically, between the sealing faces and the corresponding sealing surfaces). The mechanical loading device urges each of the face seal rings toward the corresponding sealing surface to define the respective gaps 25. The mechanical loading device may be one or more coil springs, wave springs, metal bellows, or the like. FIGS. 2 and 2A illustrate a singular spring being used to load both face sealing rings 20 and 21. In other embodiments, one or more springs may be symmetrically disposed around the circumference. For example, a minimum of three equally spaced springs around the circumference may be used. FIG. 2B illustrates a separate spring being used to load each individual face sealing ring. A minimum of three equally spaced coil springs may be used around the circumference for symmetry or a single wave spring may be used.

Figure 3:
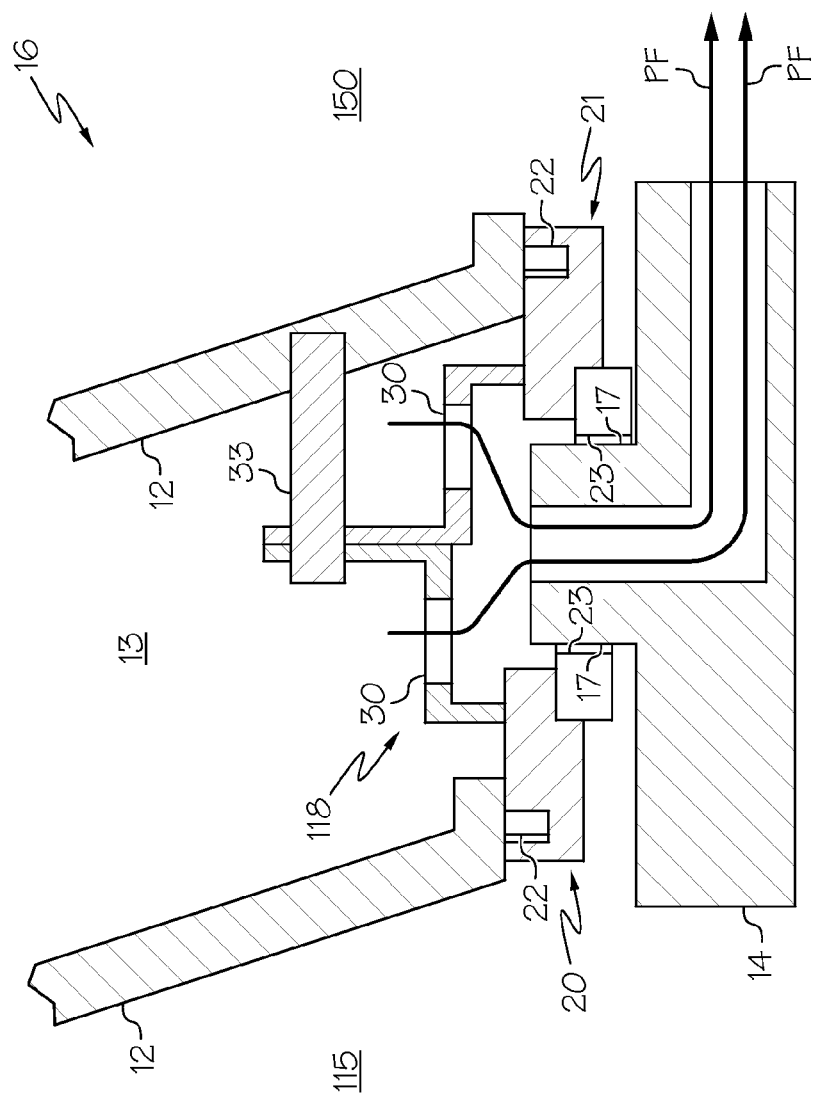
FIG. 3 is a cross-sectional view similar to FIG. 2 with a fluid transfer seal assembly according to another embodiment of the present invention.

FIG. 3 illustrates fluid transfer system 16 including another embodiment of fluid transfer seal assembly 18 in which the spring 26 has been omitted and the pair of face seal rings 20 and 21 are connected together as a single unit, such embodiment referred to herein as fluid transfer seal assembly 118. The pair of face seal rings may be connected together mechanically with fasteners (not shown) or by other methods. While fluid transfer seal assembly 118 of FIG. 3 is illustrated as being purposefully asymmetrical (as a result of a pressure balancing technique as hereinafter described) because of unequal pressures in the lower pressure regions 15 (more specifically identified in FIGS. 3 through 3C as forward lower pressure region 115 and aft lower pressure region 150), it is to be understood that fluid transfer seal assembly of FIG. 3 may be symmetrical (e.g., FIG. 3A) if the pressure in forward lower pressure region 115 and in aft lower pressure region 150 are equal as hereinafter described. The pressure balancing technique may be performed for embodiments of fluid transfer seal assembly 18 (i.e., fluid transfer seal assembly 118) in which the spring(s) are omitted and the pair of face seal rings 20 and 21 are connected together as a single unit (such as in FIGS. 3 through 3C). Unequal and therefore unbalanced pressures between the forward lower pressure 115 region and the aft lower pressure region 150 impart a net load to the face sealing rings that are connected together as a single unit (as in fluid transfer seal assembly 118), undesirably transmitting the net load to the rotatable component.

Figure 3C:
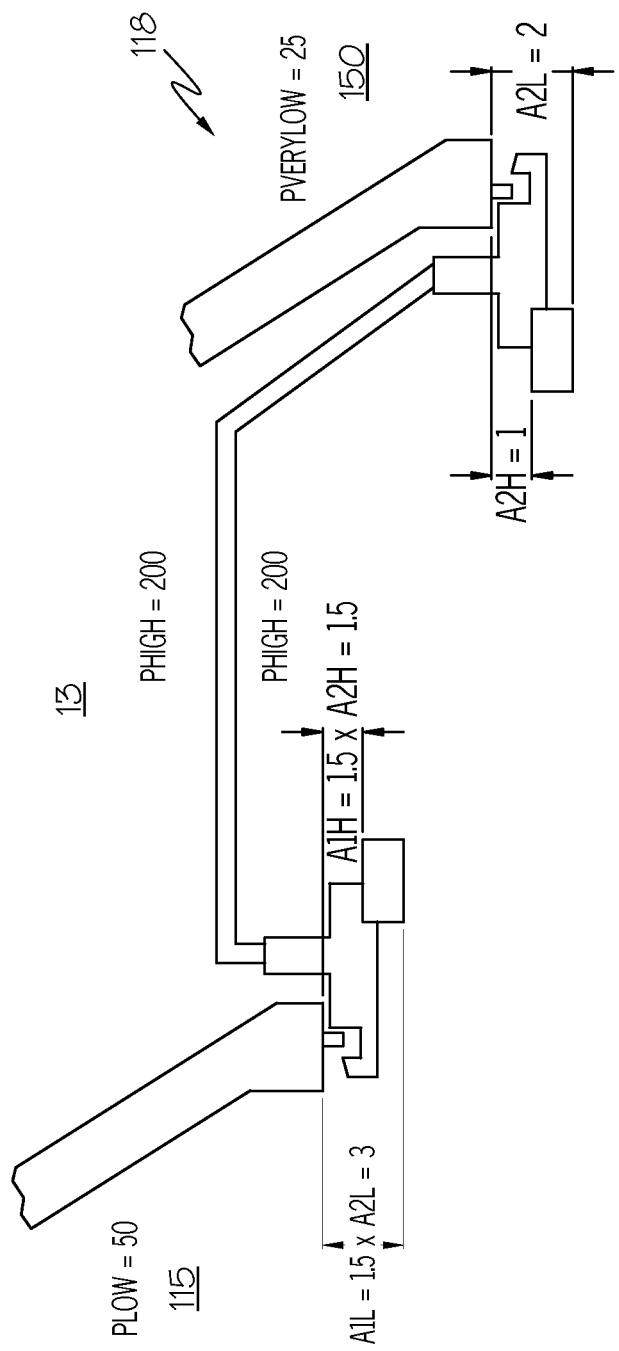
Figure 3D:
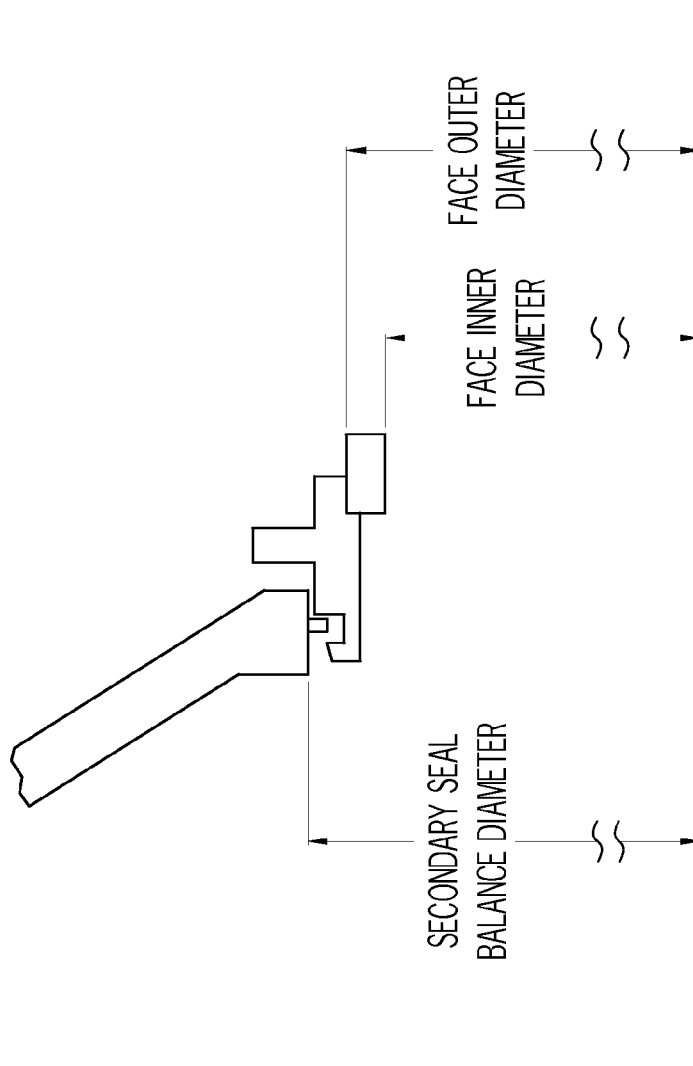
FIG. 3D is a schematic diagram illustrating the determination of face seal and secondary seal diameters.

FIGS. 3A through 3C illustrate how pressures in the lower pressure regions 15 (more specifically, the pressure in the forward lower pressure region 115 relative to the aft lower pressure region 150) affect symmetry of the fluid transfer seal assembly 118. In FIGS. 3A through 3C, the pressure in the high pressure region 13 is referred as "PHIGH" and in the forward lower pressure regions 115 as "PLOW". For FIGS. 3B and 3C, the pressure in the aft lower pressure region 150 is referred to as "PVERYLOW". The seal loading areas in the high pressure region 13 are referred to as A1H (the left side) and A2H (the right side) and the seal loading areas in the lower pressure regions 115 and 150 are referred to respectively as A1L and A2L. The pressure across the hydrodynamic seals A and B is ignored for purposes this discussion. The seal loading areas (A1H and A2H) in the high pressure region 13 refer to the radial diameter between the sealing face inner and outer diameters (FIG. 3D). The seal loading areas in the lower pressure regions 115 and 150 (A1L and A2L) refer to a secondary seal balance diameter (i.e., the radial dimension between a lower surface of the seal nose and an upper surface of the secondary seal) (FIG. 3D)).

Referring now specifically to FIG. 3A, fluid transfer seal assembly 118 is symmetrical as noted previously because the pressure in the forward lower pressure region 115 is equal to the pressure in the aft lower pressure region 150 such that there is no net load that can be transmitted to the rotatable component. In FIG. 3A, A1L×PLOW=A2L×PLOW and A1H×PHIGH=A2H×PHIGH, thereby canceling out the pressure forces.

FIG. 3B illustrates the symmetrical fluid transfer seal assembly 118 of FIG. 3A and unequal lower pressure regions (more specifically, the pressure in forward lower pressure region 115 (PLOW) is intermediate the pressure in the high pressure region 13 (PHIGH) and the aft lower pressure region 150 ("PVERYLOW")), thereby undesirably imparting a net load on the connected face sealing rings. For example, if PHIGH=200 and A1H and A2H=1 but PLOW=50 and PVERYLOW=25 and A1L and A2L=2, A1L×PLOW=2×50=100 lbs; A2L×PVERYLOW=2×25=50 lbs; these forces do not cancel out, undesirably resulting in a 50 lb net load to the right as illustrated. The 50 lb net load would be undesirably transmitted to the rotatable component if left uncorrected (i.e., if the pressure balancing technique is not performed).

FIG. 3C illustrates an asymmetrical fluid transfer assembly (such as shown in FIG. 3), resulting from performing the pressure balancing technique on the fluid transfer seal assembly of FIG. 3B. FIG. 3C illustrates that face and balance diameters may be increased or decreased (i.e., shifted) to compensate for unequal pressure in the lower pressure regions 115 and 150 (such as in FIG. 3B). More specifically, the face seal and secondary seal diameters (FIG. 3D) on the left side of the fluid transfer seal assembly of FIG. 3B (the higher lower pressure region) have been radially increased in diameter in FIG. 3C to increase the seal pressure loading areas by an exemplary 50% (i.e., A1L and A1H have each been increased by an exemplary 50%), resulting in canceling out the pressure forces that initially resulted from the unequal lower pressure regions 115 and 150 of FIG. 3B. The net result is that the two opposing 100 lb forces cancel each out, leaving the asymmetrical fluid transfer assembly with no net load. The pressures acting across the seal faces will also contribute to a load to the left. Therefore, for this example, the seal diameter on the left side would not need to be increased by the full 50%. More specifically, in FIG. 3C, A1L×PLOW=3×50=150 lbs. A2L×PVERYLOW=2×25=50 lbs. These forces do not cancel out each other, resulting in a 100 lb load to the right. A1H×PHIGH=1.5×200=300. A2H×PHIGH=1×200=200. These forces do not cancel out each other, resulting in a 100 lb load to the left. The net result is that these two opposing 100 lb forces cancel out each other, leaving the fluid transfer seal assembly of FIG. 3C with no net load. The examples provided above for FIGS. 3B and 3C are provided for illustration purposes only, and are not meant to limit the various embodiments of the present invention in any way.

While aft lower pressure region 150 has been described as having a lower pressure than forward lower pressure region 115, it is to be understood that aft lower pressure region 150 may have a higher pressure than forward lower pressure region 115. If aft lower pressure region 150 has a higher pressure than forward lower pressure region 115, the diameter adjustments in the above-described pressure balancing technique would need to occur on the aft side of the fluid transfer seal assembly 118 (as the aft lower pressure region is now the higher lower pressure region in this case) instead of the forward side of the fluid transfer assembly 118 as described above for FIGS. 3B and 3C.

Figure 4:
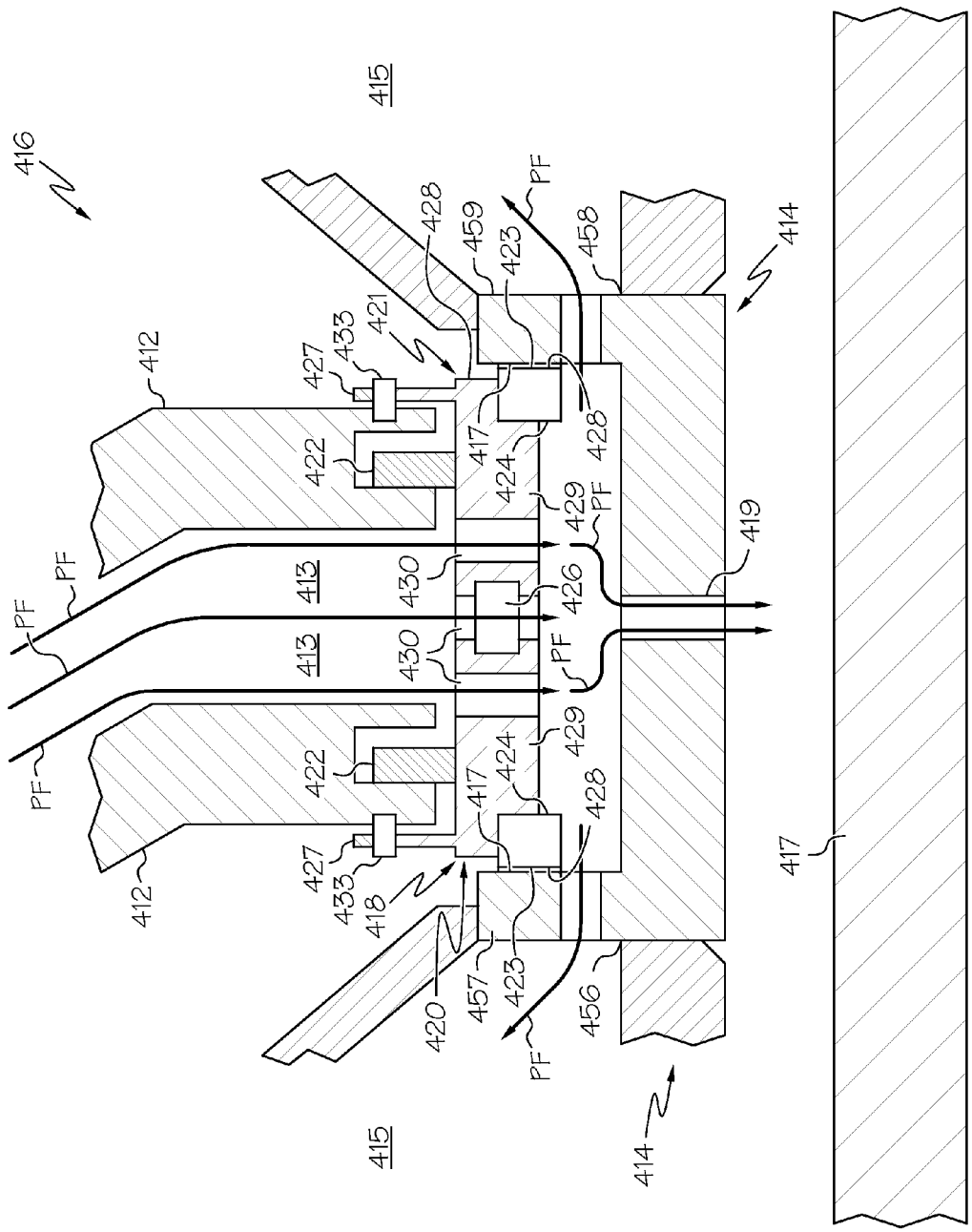
FIG. 4 is a cross-sectional view of a fluid transfer seal assembly in a fluid transfer system according to yet another exemplary embodiment of the present invention.

FIG. 4 illustrates another exemplary embodiment of a fluid transfer system 416 including a fluid transfer seal assembly 418. Like fluid transfer system 16, fluid transfer system 416 comprises a stationary component 412 (exemplified by a stationary housing (partially shown)) having an interior 413 containing process fluid under pressure, a rotatable component 414, and fluid transfer seal assembly 418 disposed across the interface between the stationary component 412 and the rotatable component 414. The interior 413 of the stationary component may be a high pressure region relative to a pair of surrounding lower pressure regions 415. However it is to be understood that while the interior 413 is described as a high pressure region that is disposed between a pair of surrounding lower pressure regions 415, the high and lower pressure regions may be reversed such that the regions surrounding the stationary component may be at a higher pressure relative to the pressure in the interior of the stationary component. The rotatable component 414 includes a pair of sealing surfaces 417 and a hub portion 419, for purposes as hereinafter described. The rotatable component is in fluid flow communication with the interior 413 of the stationary component containing the process fluid under pressure via one or more fluid passageways comprising a plurality of fluid passageway segments 430 in the fluid transfer seal assembly 418. The rotatable component 414 is a segmented rotatable component comprising a forward segment 456 with a forward seat portion 457, an aft segment 458 with an aft seat portion 459, and the hub portion 419. Each of the forward segment 456, the aft segment 458, and the hub portion 419 include a fluid passageway segment therein for transferring process fluid from the stationary component 412 through and around the segmented rotatable component 414 via fluid transfer seal assembly 418.

Still referring to FIG. 4, in accordance with exemplary embodiments, fluid transfer seal assembly 418 generally comprises a pair of face seal rings 420 and 421 and a pair of secondary seals 422 similar to face seal rings 20 and 21 (FIG. 2). Face seal rings 420 and 421 are each comprised of a seal nose 424 with the sealing face 428, a retainer 429 that supports the seal nose 424, and a retainer extension 427. The retainer includes a groove (not shown in FIG. 4) for receiving the secondary seal 422. The retainer extension 427 may be attached as a separate part (e.g., as a Z-shaped retainer extension) to the retainer 429 (not shown in FIG. 4) or integral (e.g., as a longitudinal extension) with the retainer. Fluid transfer seal assembly 418 may further comprise means 433 for locking the pair of face seal rings to the stationary component 412 in a manner preventing rotation thereof with respect to the stationary component (hereinafter an "anti-rotation device") and may further comprise a mechanical loading device 426, as hereinafter described. The retainer extensions 427 may engage the anti-rotation device, as hereinafter described.

Face seal rings 420 and 421 in the illustrated fluid transfer assembly 418 are arranged in a position opposite each other, with the sealing faces 428 facing away from each other, with each of the sealing faces disposed opposite the corresponding sealing surface 417 of the rotatable component 414, i.e., each sealing face 428 is disposed opposite a sealing surface 417 on each of the forward and aft seat portions 457 and 459 of the segmented rotatable component outboard of each of the sealing faces 428. Face seal rings 420 and 421 each include fluid passageway segments 430 therethrough that are in fluid communication with the interior 413 of the stationary component and with the fluid passageway segment(s) in the rotatable component. As illustrated, the stationary component 412 is in fluid flow communication with the segmented rotatable component 414 via the one or more fluid passageways.

As with the sealing faces 28 in fluid transfer seal assemblies 20 and 21, each of the sealing faces 428 of fluid transfer seal assemblies 420 and 421 is configured to be disposed opposite a corresponding sealing surface 417 (also referred to herein as "an opposed sealing surface") of the pair of sealing surfaces to define a gap (as in gap 25 of FIG. 2) forming a hydrodynamic seal when the rotatable component rotates as hereinafter described. As each face seal ring of the pair of face seal rings has a sealing face that is configured to be opposite a corresponding sealing surface, a pair of hydrodynamic seals is formed with fluid transfer seal assembly 418. The sealing face or the sealing surface of each hydrodynamic seal has a geometric feature 423 (also referred to herein as "hydrodynamic geometry") for purposes of promoting a barrier fluid film (not shown) on which operation of the hydrodynamic seals depend, as previously described.

The secondary seals 422 in fluid transfer seal assembly 418 are disposed between and contacting the stationary component 412 and the adjacent face seal rings 420 and 421 so as to contain the process fluid within boundaries defined by the pair of secondary seals, i.e., each secondary seal closes a leak path between the stationary component and the adjacent face seal ring. Like secondary seals 22, secondary seals 422 may be an O-ring, a piston ring, a metal bellows, or the like as known in the art. If metal bellows are used as the secondary seals in fluid transfer seal assembly 418, it is to be understood that separate locking means 424 and mechanical load device 426 are unnecessary and may be eliminated from fluid transfer seal assembly 418.

Like fluid transfer seal assemblies 18 and 118, and as noted previously, fluid transfer seal assembly 418 comprise means 433 for locking the pair of face seal rings to the stationary component 412 in a manner preventing rotation thereof with respect to the stationary component (the "anti-rotation device") (if the secondary seals are not metal bellows). The locking means may comprise a pin or lug attached to the stationary component and that engages a slot or other opening in the face seal ring, or engages a component attached to or otherwise part of the face seal ring (such as the retainer extension 427 of face seal ring 420 or 421).

As noted previously, fluid transfer seal assembly 418 may further comprise a mechanical loading device 426 as exemplified by one or more springs to help insure the sealing relationship between the fluid transfer seal assembly and the rotatable component (more specifically, between the sealing faces and the corresponding sealing surfaces). The mechanical loading device may be one or more coil springs, wave springs, metal bellows, or the like. The mechanical loading device exemplified by a spring 426 may be disposed in a like-sized recess (that also serves as a fluid passageway segment 430 in a central portion of the pair of face seal rings 420 and 421). The spring 426 may be positioned in alternate locations and one or more springs may be used for symmetry. For example, a minimum of three coil-type springs may be used for symmetry.

Figure 5:
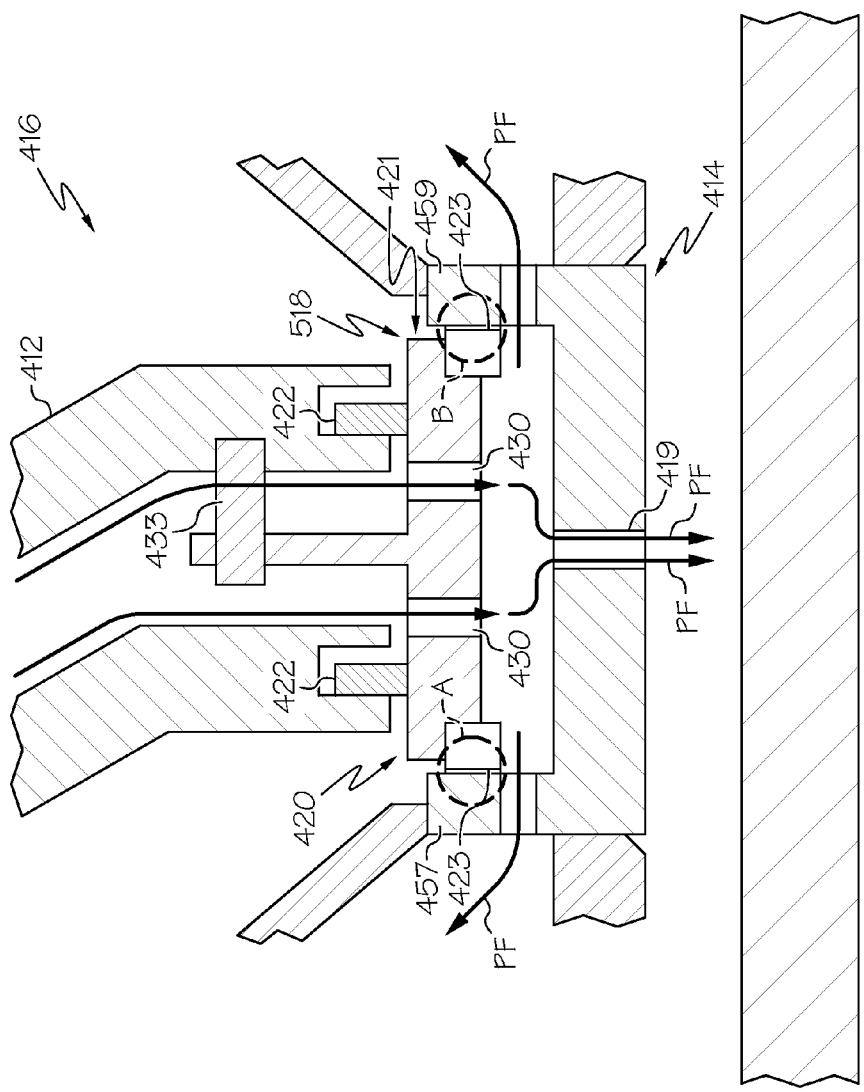
FIG. 5 is a cross-sectional view similar to FIG. 3 with a fluid transfer seal assembly according to another embodiment of the present invention.

FIG. 5 illustrates fluid transfer system 416 including another embodiment of fluid transfer seal assembly 418 in which spring 426 has been omitted and face seal rings 420 and 421 are connected together as a single unit, such embodiment referred to herein as fluid transfer seal assembly 518. Fluid transfer system and fluid transfer seal assembly of FIG. 5 is otherwise the same as described above. The hydrodynamic seals are illustrated in encircled regions A and B.

Figure 7:
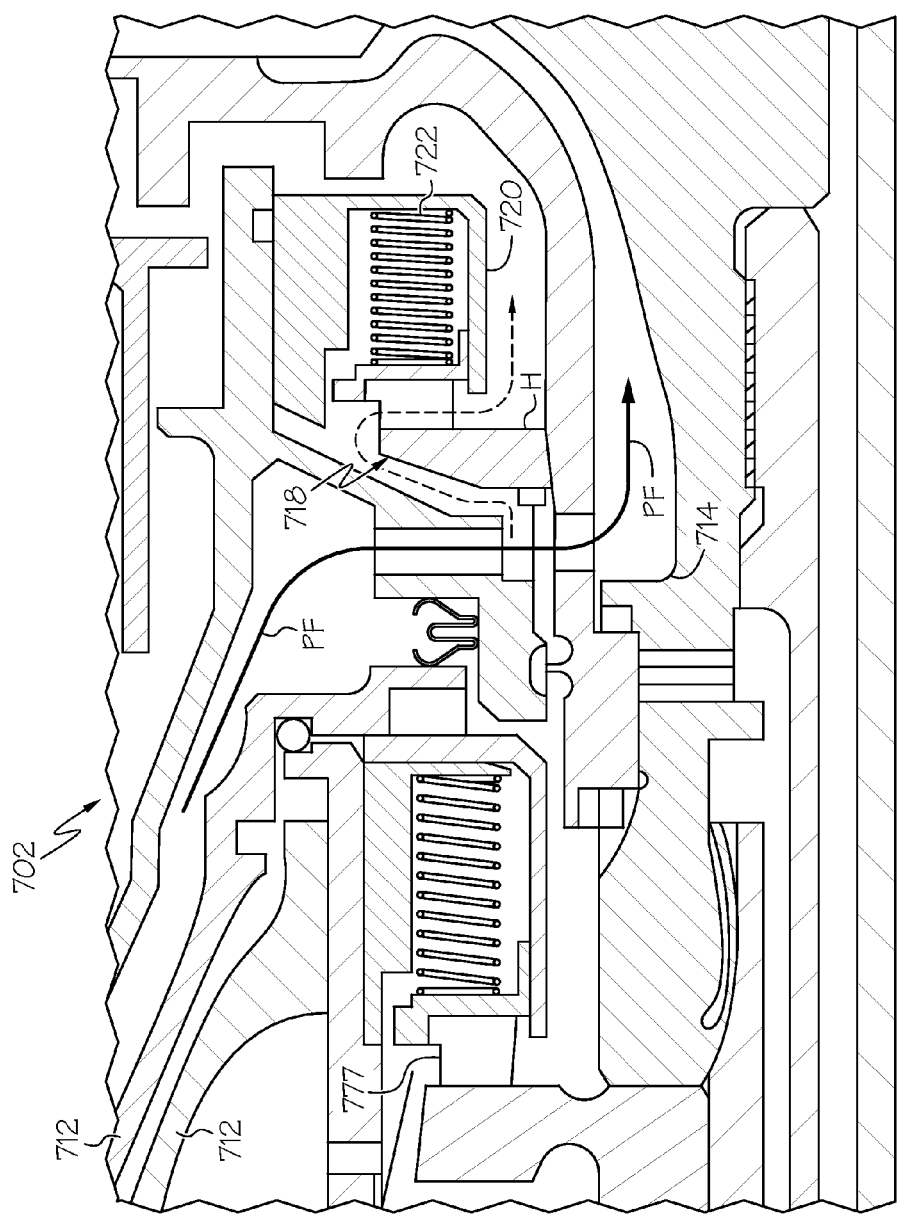
FIG. 7 is a cross-sectional view similar to FIG. 6, illustrating a fluid transfer seal assembly according to yet another exemplary embodiment of the present invention in which a single hydrodynamic seal is formed at the interface between the TOBI and the rotatable turbine section.

While fluid transfer seal assemblies comprising a pair of face sealing rings and a pair of secondary seals have been described, it is to be understood that a fluid transfer seal assembly 718 (such as shown in FIG. 7 between a TOBI 702 and a turbine (not shown in FIG. 7)) comprising a single face sealing ring 720 and a single secondary seal 722 may be used in combination with one or more conventional mechanical seals in some fluid transfer applications to transfer process fluid between a stationary component 712 and a rotatable component 714, according to exemplary embodiments. The single hydrodynamic seal between the sealing face of fluid transfer seal assembly 718 and a sealing surface of the rotatable component 714 is identified in FIG. 7 with the letter H. It is noted that fluid transfer seal assembly 718 is essentially fluid transfer assembly 118, split between the two face sealing rings. Fluid transfer seal assembly 718 may be used if the conventional mechanical seal (exemplified by a bearing compartment seal 777 in FIG. 7), acts as one of the boundaries for a fluid transfer cavity. The conventional mechanical seal is preferably a low leakage seal, as opposed to a labyrinth seal, but a labyrinth seal may be used if needed for another purpose. Like fluid transfer seal assemblies 18, 118, 418, and 518, fluid transfer seal assembly 718 may further comprise an anti-rotation device and a mechanical loading device as previously described. As noted previously, when a metal bellows is used as the secondary seal in a fluid transfer seal assembly, a separate anti-rotation device and mechanical load device are unnecessary and may be eliminated from the fluid transfer seal assembly. As the secondary seal 722 in FIG. 7 is exemplified as a metal bellows, a separate anti-rotation device and mechanical loading device are unnecessary for the illustrated fluid transfer seal assembly 718 of FIG. 7. It is to be understood, however, that if a secondary seal other than a metal bellows (e.g., an O-ring, piston ring, or the like) were used, fluid transfer seal assembly 718 of FIG. 7 further comprises the anti-rotation device and the mechanical loading device.

Referring again to FIG. 1, according to exemplary embodiments, method 10 for transferring a process fluid between stationary and rotating components continues by disposing the fluid transfer seal assembly between the stationary component and the rotatable component (step 200). The fluid transfer seal assembly is disposed such that the rotatable component is in fluid flow communication with the stationary component, the sealing face of each face seal ring is disposed opposite a corresponding sealing surface of the pair of sealing surfaces defining a gap therebetween, and each secondary seal is disposed between and contacting an adjacent face seal ring of the pair of face seal rings and the stationary component.

Figure 6:
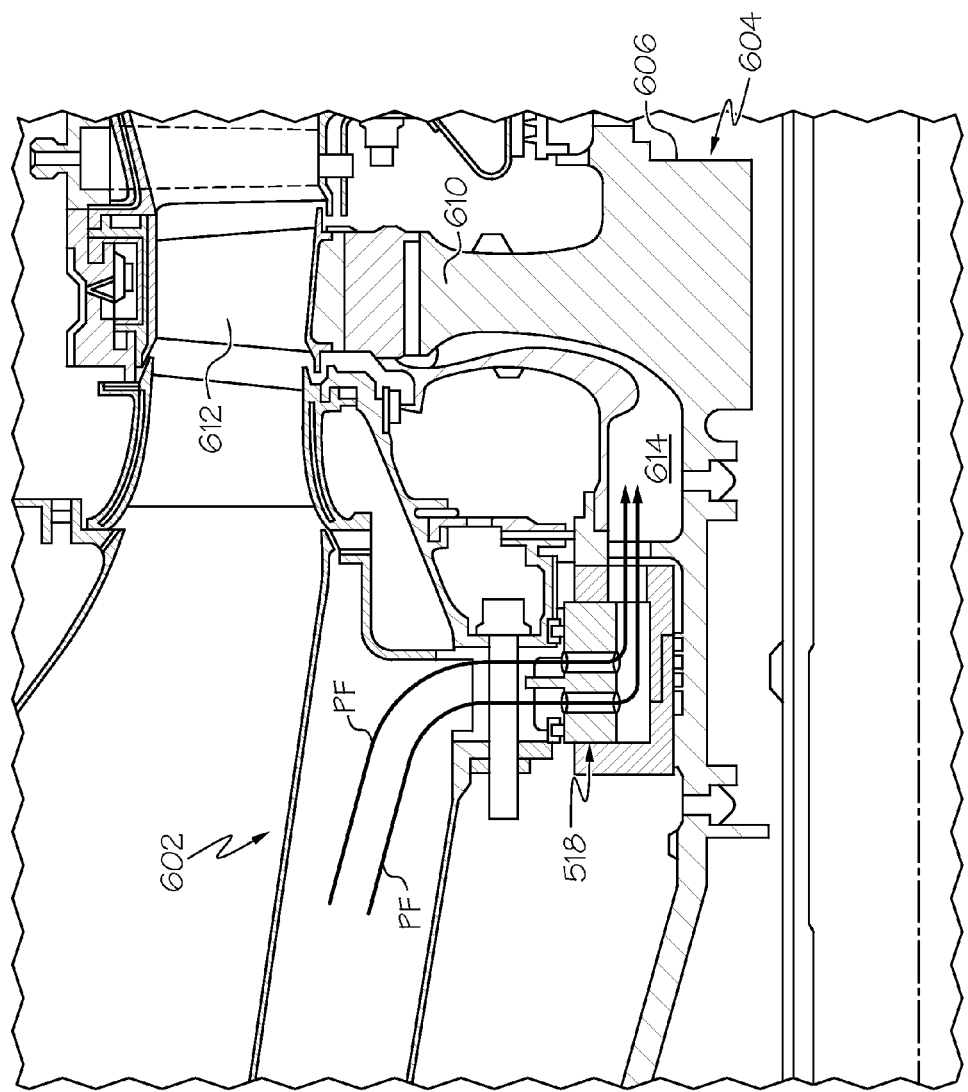
FIG. 6 is a cross-sectional view of a turbine rotor assembly of a gas turbine engine (not shown), illustrating the fluid transfer seal assembly of FIG. 5 disposed in an interface between a stationary tangential onboard injector (TOBI) and a rotatable turbine section of the gas turbine engine.

FIG. 6 illustrates fluid transfer seal assembly 518 (FIG. 5) in use in an exemplary application to transfer process fluid between a stationary tangential on board injector (TOBI) (the stationary component) and a rotating turbine of a gas turbine engine (not shown). FIG. 6 is a partial sectional and elevational view of the tangential on board injector (TOBI) 602 and a portion of the turbine section 604 of the gas turbine engine. Turbine section may comprise a turbine rotor assembly 606 capable of rotation about a central axis. Cooling air (indicated by arrows PF may be bled from the compressor section (not shown) of the gas turbine engine and passed through the tangential onboard injector (TOBI) 602, i.e., the TOBI provides cooling air to the turbine of the gas turbine engine. The turbine comprises a disk 610 supporting a plurality of circumferentially spaced blades (one such blade 612 is shown in FIG. 6). In particular, an inlet of the TOBI 602 receives air from a compressor of the gas turbine engine (again, not shown) or another source of cooling air and passes it through annular spaced nozzles that impart a swirling moment and direct the discharging stream tangentially to the rotating turbine. The cooling air discharged from the TOBI is delivered into a cavity 614 upstream of the turbine. The cavity is sealed off by the fluid transfer seal assembly 518 that interfaces between the rotating and non-rotating structures. In accordance with exemplary embodiments, the boundaries of the cavity are defined by the housing and the fluid transfer seal. While fluid transfer seal assembly 518 of FIG. 5 is depicted in the gas turbine engine of FIG. 6, it is to be understood that any of fluid transfer seal assemblies 18, 118, 418, or 718 may alternatively be used depending upon its application and the rotating equipment in which it it/they are to be used. In addition, while the fluid transfer seal assemblies are specifically described in a TOBI application, it is to be understood that such fluid transfer seal assemblies may be used in any other application requiring that a process fluid be controllably transferred across an interface between a stationary component and a rotating component in rotating equipment having at least one component which is rotatable with respect to at least one other adjacent component.

Referring again to FIG. 1, according to exemplary embodiments, method 10 for transferring a process fluid between the stationary and rotating component continues by causing the rotatable component to rotate (step 300). The rotatable component is caused to rotate by operating the rotating equipment as known in the art. The rotatable component becomes a "rotating component" upon rotation. As noted previously, sealing faces and corresponding sealing surfaces of the hydrodynamic fluid transfer seals separate when the lifting force is sufficient to overcome the closing force produced by the mechanical loading device (if any) and any pressure caused closing forces resulting from the face sealing ring geometry and the pressure differential across the hydrodynamic fluid transfer seal. The speed at which separation occurs depends upon the specific hydrodynamic geometry used and the total closing forces. As also noted previously, the fluid transfer seal assemblies facilitate fluid transfer even without rotation of the rotatable component, but there will be no hydrodynamic fluid film generated in the gap between the sealing faces and the corresponding sealing surfaces of the fluid transfer seal assembly, to reduce seal rubbing. However, without rotation, the hydrodynamic fluid film is unnecessary as there is no seal rubbing or friction.

Referring again to FIG. 1, according to exemplary embodiments, method 10 for transferring a process fluid between the stationary and rotating component continues by optionally directing a barrier fluid into the gap between the sealing face and corresponding seal surface of each hydrodynamic seal (step 350). This step is included only if the barrier fluid is different than the process fluid. That step 350 is optional is indicated by phantom lines in FIG. 1.

Referring again to FIG. 1, according to exemplary embodiments, method 10 for transferring a process fluid between the stationary and rotating components continues by transferring the process fluid from the high pressure region into the lower pressure regions through the one or more fluid passageways (step 400), i.e., the pressurized process fluid is transferred or pumped (if the rotatable component is rotating) from the high pressure region in the interior of the stationary component, through the fluid passageway segments in the fluid transfer seal assembly, and into the one or more fluid passageway segments in the rotatable component, for passage of the process fluid within the rotatable component. Thus, process fluid under pressure is transferred from the stationary component to the rotating component by way of the fluid transfer seal assembly. The hydrodynamic seals between each of the opposed sealing face and corresponding sealing surface in each fluid transfer seal assembly facilitates process fluid transfer between the stationary component and the rotating component and substantially prevents process fluid leakage or ingestion between the stationary component and the rotating component, i.e., along the rotating component. Such sealing is done without generating excessive heat and differing pressure loads that may exist on the sealing components may be managed to substantially prevent overload and seal rubbing. As illustrated, the process fluid (the flow indicated by the arrows PF) flows from the high pressure region in the interior of the stationary component, through the fluid passageway segments in the selected fluid transfer seal assembly, and through the fluid passageway segments in the segmented rotating component (more specifically, through and around the segmented rotating component).

Selecting which of fluid transfer seal assemblies 18, 118, 418, 518, or 718 to use depends upon the specific arrangement of the stationary and rotatable components in the rotating equipment and can be determined by one skilled in the art. For example, fluid transfer seal assembly 518 of FIG. 5 is inherently more compact than fluid transfer seal assembly 418 of FIG. 4. The compactness of fluid transfer seal assembly 518 allows it to fit in a smaller radial and axial envelope than fluid transfer seal assemblies 18, 118, or 418. Therefore, in a smaller gas turbine engine, fluid transfer seal assembly 518 of FIG. 5 may be better suited than fluid transfer seal assemblies of FIGS. 2 through 4.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fluid transfer seal assembly for transferring process fluid between a stationary component and a rotating component, the rotating component including a sealing surface, the fluid transfer seal assembly comprising:
   a pair of face seal rings each having a seal nose with a sealing face and a retainer having a first side substantially opposite a second side, the second side that supports the seal nose, the retainer including a groove defined on the first side, the pair of face seal rings each having at least one segment of a fluid passageway in fluid communication with the stationary component and the rotating component, and the sealing face configured to be disposed opposite of the sealing surface, one of the sealing face or the opposed sealing surface including a geometric feature for forming a hydrodynamic seal therebetween; and a pair of secondary seals each received in a respective one of the grooves, the pair of secondary seals each configured to be disposed between and contacting the respective one of the pair of face seal rings and the stationary component, wherein the sealing face of each face sealing ring faces away from each other and is disposed opposite a corresponding sealing surface disposed outboard thereof.

2. The fluid transfer seal assembly of claim 1, wherein each of the face seal rings is axially movable and non-rotating.

3. The fluid transfer seal assembly of claim 1, wherein the pair of secondary seals are selected from the group consisting of a metal bellows, an O-ring, and a piston ring, wherein if the selected secondary seal comprises an O-ring or a piston ring, the fluid transfer seal assembly further comprises means for locking the respective face seal ring to the stationary component in a manner preventing rotation thereof with respect to the stationary component.

4. The fluid transfer seal assembly of claim 3, wherein if the selected secondary seal comprises an O-ring or a piston ring, the fluid transfer seal assembly further comprises a mechanical loading device to substantially insure a sealing relationship between the fluid transfer seal assembly and the rotating component.

5. A fluid transfer system comprising:
a stationary component having an interior containing process fluid under pressure;
a rotatable component in fluid flow communication with the interior of the stationary component via a fluid passageway, the rotatable component having a sealing surface along a portion thereof; and
a fluid transfer seal assembly disposed between the stationary component and the rotatable component, the fluid transfer seal assembly comprising:
a pair of face seal rings having a seal nose with a sealing face, a retainer that supports the seal nose and a retainer extension that extends from a first side of the retainer, the retainer including a groove defined on the first side, the pair of face seal rings each having at least one segment of the fluid passageway defined through the retainer extension and in fluid communication with the stationary component and the rotating component, and the sealing face configured to be disposed opposite of the sealing surface, one of the sealing face or the opposed sealing surface including a geometric feature for forming a hydrodynamic seal therebetween, and
a pair of secondary seals each received in a respective one of the grooves, the pair of secondary seals each configured to be disposed between and contacting a respective one of the pair of face seal rings and the stationary component.

6. The fluid transfer system of claim 5, wherein each of the face seal rings is axially movable and non-rotating.

7. The fluid transfer system of claim 6, wherein the rotatable component includes a central hub portion having the sealing surface along opposite sides thereof, the sealing face of each face seal ring disposed opposite and facing the other sealing face to define an axial space therebetween for receiving the central hub portion with the central hub portion disposed between the sealing faces with a gap on each side of the central hub portion.

8. The fluid transfer system of claim 7, wherein the pair of face seal rings are connected as a single unit.

9. The fluid transfer system of claim 8, wherein the interior of the stationary component contains process fluid under high pressure and the exterior of the stationary component comprises a forward lower pressure region and an aft lower pressure region, wherein if the pressure in the forward and aft lower pressure regions is equal, the fluid transfer seal assembly comprises a symmetrical fluid transfer seal assembly and if unequal, the fluid transfer seal assembly comprises an asymmetrical fluid transfer seal assembly.

10. The fluid transfer system of claim 9, wherein a face diameter and a secondary seal balance diameter in the higher lower pressure region are radially increased relative to the face diameter and the secondary seal balance diameter in the other lower pressure region in the asymmetrical fluid transfer seal assembly.

11. The fluid transfer system of claim 5, wherein the pair of secondary seals are selected from the group consisting of a metal bellows, an O-ring, and a piston ring, wherein if the selected secondary seal comprises an O-ring or a piston ring, the fluid transfer seal assembly further comprises means for locking the respective face seal ring to the stationary component in a manner preventing rotation thereof with respect to the stationary component.

12. The fluid transfer system of claim 11, wherein if the selected secondary seal comprises an O-ring or a piston ring, the fluid transfer seal assembly further comprises a mechanical loading device to substantially insure a sealing relationship between the fluid transfer seal assembly and the rotatable component upon rotation.

13. The fluid transfer system of claim 5, wherein a gas turbine engine has a turbine as the rotatable component and a source of cooling air for cooling the turbine and a tangential on board injector (TOBI) for directing the cooling air to the turbine, the fluid transfer seal assembly disposed between the TOBI and the turbine of the gas turbine engine.

14. A method for transferring process fluid from a stationary component containing the process fluid under pressure to a rotating rotatable component via a fluid transfer seal assembly, the rotatable component having a sealing surface, the method comprising:
disposing the fluid transfer seal assembly between the stationary component and the rotatable component such that the rotatable component is in fluid flow communication with the stationary component, the fluid transfer seal assembly comprising:
a pair of face seal rings having a seal nose with a sealing face, a retainer that supports the seal nose and a retainer extension that extends from a first side of the retainer, the retainer including a groove defined on the first side, the pair of face seal rings each having at least one segment of a fluid passageway defined through the retainer extension, and the sealing face configured to be disposed opposite the sealing surface of the rotatable component for forming a gap therebetween, only one of the sealing face or the opposed sealing surface including a geometric feature for forming a hydrodynamic seal in the gap;
a pair of secondary seals each received in a respective one of the grooves, the pair of secondary seals each disposed between and contacting a respective one of the pair of face seal rings and the stationary component; and causing the rotatable component to rotate, thereby transferring the process fluid from the stationary component to the rotating component through the fluid passageway and into the gap forming the hydrodynamic seal.

15. The method of claim 14, wherein the process fluid comprises a barrier fluid for the hydrodynamic seal.

* * * * *